INVENTOR
RICHARD JAMES ALBERT

ATTORNEY

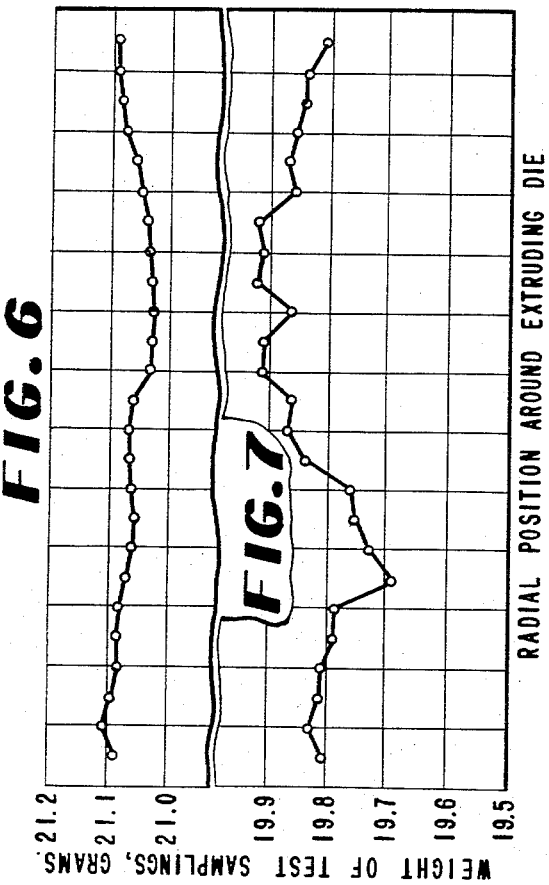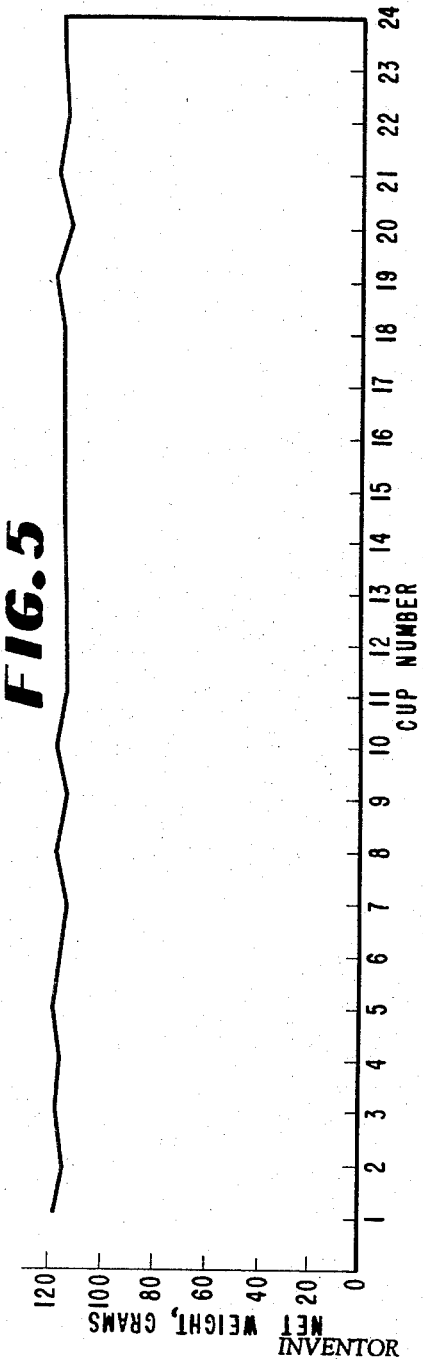

United States Patent Office 3,418,687
Patented Dec. 31, 1968

3,418,687
EXTRUDING APPARATUS
Richard James Albert, Clinton, Iowa, assignor to E. I. du Pont de Nemours and Company, Wilmington, Del., a corporation of Delaware
Filed Oct. 24, 1966, Ser. No. 589,008
4 Claims. (Cl. 18—14)

ABSTRACT OF THE DISCLOSURE

An apparatus for extruding organic polymeric materials is provided comprising a feeder for advancing a stream of polymeric material, an annular extruder die for forming said organic polymeric material into tubular form and an adapter operatively interconnecting said feeder and said extruding die wherein said adapter is characterized by tubular flow passages communicating with said feeder and a cylindrical flow insert therein having bifurcated flow passages in connection with a helical flow path located internally thereof adapted to advance axially a progressively increasing amount of said polymeric material toward said annular extruding die.

---

The present invention relates to the extrusion of polymeric material and, more particularly, is directed to an extrusion device having improved flow characteristics.

An important requirement in the extrusion of polymeric materials is that regarding the uniformity of flow of the polymeric material in the extruding device. For instance, in the extrusion of polymeric materials in film form it is known that the gauge or thickness of the film, its unit weight and roll formation characteristics are directly affected by the uniformity of flow of the polymeric material through the extrusion die and associated mechanical devices in the course of manufacture thereof. Also, non-uniform flow of polymeric material in other parts of the extruding apparatus as in the die adapter portion thereof which is positioned intermediate the usual screw-type cylindrically-shaped feeder and the extrusion head cannot be completely corrected at the extrusion die. The non-uniform flow also causes non-random weight variation in extruded films, normally referred to as standing gauge, which leads to poor roll formation such as roll telescoping and rolls having variations in the diameter thereof. Furthermore, stagnate areas in the flow path in the die adapter and the extruding die itself are undesirable since polymeric material therein degrades and causes poor quality film to be produced especially as when particles of degraded polymer are extruded. The latter contribute to film breaks and undesirable film appearance. Various attempts such as disclosed in U.S. Patents Nos. 2,260,750 and 2,794,213 made heretofore to overcome the many problems encountered during extrusion of polymeric materials such as poor seam formation and streaking of tubular structures have not provided a solution to the standing gauge problem occurring during the extrusion of film structures. Accordingly, it is the principal object of the present invention to provide a new construction of extrusion devices for extruding polymeric materials that are free of the above-mentioned drawbacks.

According to the present invention, there is provided an apparatus for extruding polymeric material having an improved die adapter and feed inlet therefor. The nature and advantages of the invention will be more clearly understood by the following description and the several views illustrated in the accompanying drawings wherein like reference characters refer to the same parts throughout the several views and in which:

FIGURE 5 shows the radial distribution of silicone oil flowing through the apparatus of FIGURE 2, as is more fully explained herebelow; and FIGURES 6 and 7 show the radial distribution of polypropylene through the apparatus of the present invention and apparatus not of the present invention, as is more fully explained herebelow.

Figure 2:
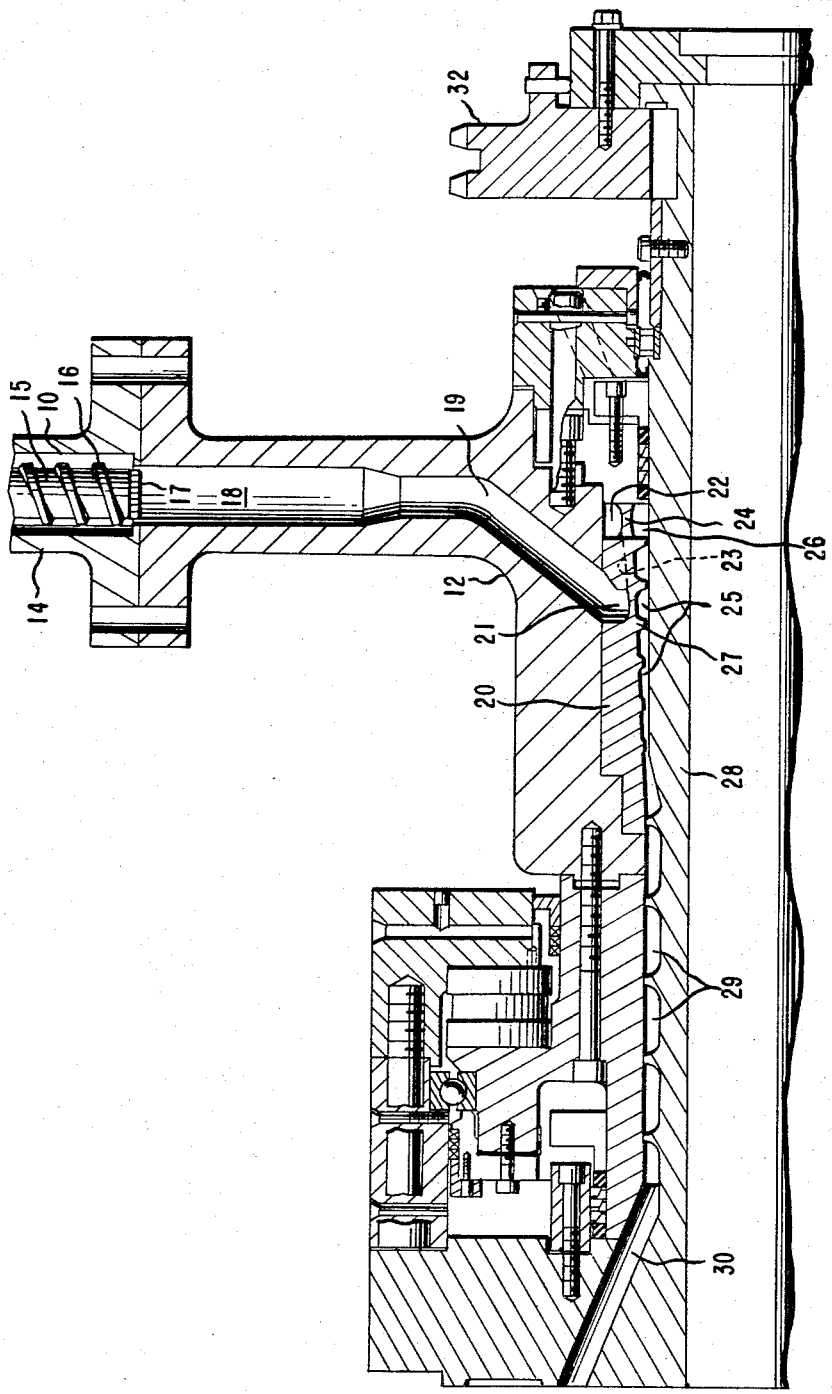
FIGURE 2 is a cross-sectional view showing in detail the die adapter portion of and its relation to the apparatus of the present invention.

The extruding device herein disclosed in illustration of the invention includes a feeder 10, a cross-head extruding die 11 and a die adapter 12 interposed therebetween whereby molten polymeric material issuing from feeder 10 flows first through adapter 12 and then through extruding die 11 from whence it issues in tubular form 13. Referring to FIGURE 2 in particular, the feeder 10 may be of any suitable conventional design such as a screw-feeder having a cylindrical outer wall 14 and a screw-type advancer 15 adapted for rotation within 14 and to advance polymeric material by means of flights 16 from an inlet point (not shown) to exit point 17. The polymeric material issues from feeder 10 in melt form and flows through adapter 12 which changes its course or direction about 90 degrees. The molten polymeric material enters adapter 12 by means of conduit 18 therein and flows along conduit 18 to another conduit 19 which gradually alters the course of the polymeric material as shown in FIGURE 2. The polymeric material flows from conduits 18 and 19 in the die adapter into flow insert 20 which is constructed and arranged to complete the change in direction of the polymer flow from that in substantial alignment axially with feeder 10 to that which is in substantial alignment with cross-head die 11.

Figure 3:
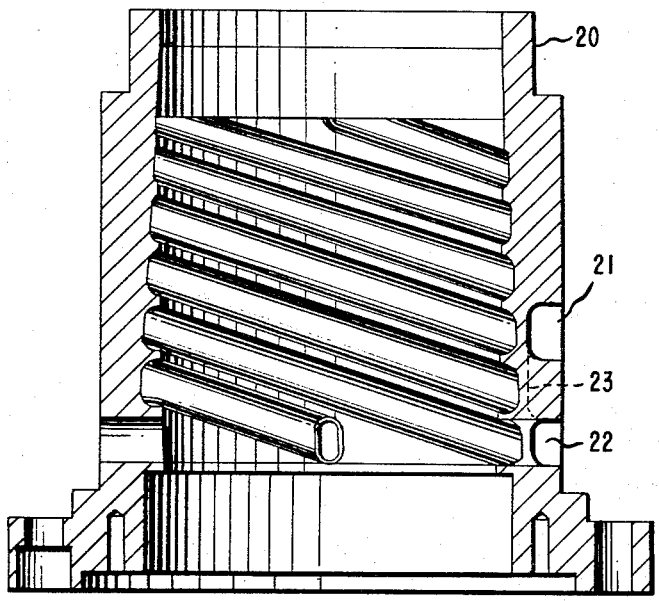
FIGURE 3 is a detail view of the die adapter portion of the apparatus of the present invention.
Figure 4:
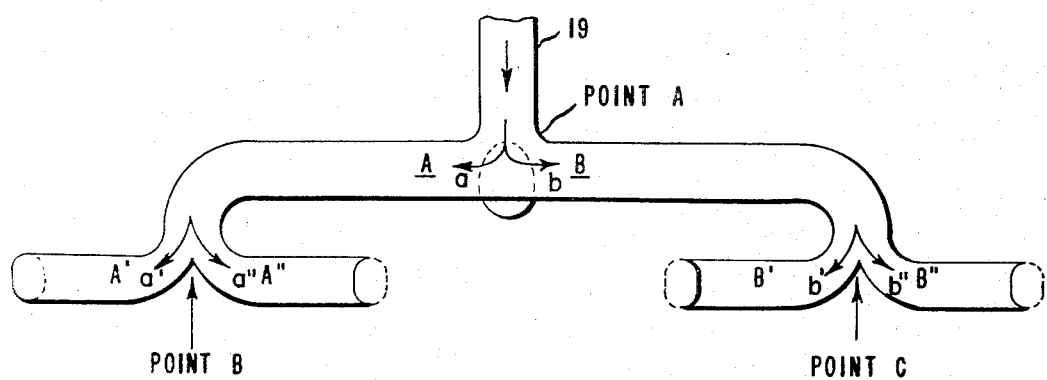
FIGURE 4 is a schematic illustration of the flow channels and the path for the flow of polymeric material around the flow insert portion of the die adapter shown in FIGURES 2 and 3.

Flow insert 20 in die adapter 12 is provided with a single side inlet 21, as shown in FIGURES 2 and 3, which is in direct communication with flow channel 19 in a manner adapted to permit flow of polymeric material therebetween and therethrough. Flow insert 20 also is provided with a plurality of flow passages such as 22, which are in direct communication with side inlet 21 by way of interconnecting flow passages 23 for distributing the polymeric material substantially completely therearound. The flow passages around flow insert 20 are twice bifurcated around the periphery thereof to provide four ports 24 substantially equally spaced thereabout for feeding the flow of polymeric material into internally located helical flow path 25. The twice bifurcated flow passage about flow insert 20 is more readily understood by reference to FIGURE 4 which is a schematic representation of the flow path about flow insert 20. As shown in FIGURE 4, the flow passage corresponding to 19 meets side inlet 21 at Point A where the flow passage is divided into two identical flow paths A and B in a manner adapted to cause polymeric material to flow in the direction shown by arrows $a$ and $b$. Flow paths A and B each extend substantially an equal distance around flow insert 20, and at Points B and C each of flow paths A and B is divided into flow paths A', A" and B', B", respectively, resulting in four flow paths adapted to cause polymeric material to flow in the directions of arrows $a'$, $a''$ and $b'$ and $b''$. The latter four flow paths communicate directly by way of entry ports 24 with the first turn 26 in helical flow path 25. In tracing the flow of polymeric material in flow insert 20, the molten polymeric material flows from conduit 19 into the single side delivery inlet 21 whereupon the polymer stream is bifurcated and forced around the periphery of flow insert 20 in opposite directions along flow paths A and B whereupon each having traveled substantially 90° from entry port or inlet 21 is again bifurcated and forced around the periphery in opposite directions as at A', A" and B', B" and made to enter the helical flow passage 25 at four entry ports spaced substantially 90° apart thererabout. The polymer melt upon flowing through each of the four entry ports encounters the helical flow path. As shown in FIGURE 2, the internal surface of cylindrically shaped flow insert 20 is provided with a helix having channels 25 and a plurality of lands as at 27 adapted to force the polymeric material to flow in a path more favorable to the shear rheology characteristics thereof. The helix flow path initially forces substantially all of the polymeric material to flow in a substantially helical path since the first several leads of the helix have essentially minimum clearance between the helix land and the inner tubular core 28 passing axially through flow insert 20. At each succeeding lead of the helix, there is an increased clearance between the helix land as at 27 and the tubular core, and an accompanying increased flow of polymeric material in the axial direction in the clearance between said helix land and the tubular core. The depth of groove of the helix correspondingly decreases as the polymer moves axially towards the extruding die. As the advancing polymer leaves the helix path, it enters a spiral path 29 located on the surface of tubular core 28. The spiral passage on tubular core 28 is of substantially uniform depth, land crest and land clearance and extends along the longitudinal section of the rotatable die adapter toward the extruding die 11. The die adapter 12 is provided with a plurality of discharge passages 30, as for example eight such passages, near its terminal end. The discharge passages 30 are equally distributed radially of the central axis of the die adapter and communicate with entrance passages located internally of die 11 so as to permit the flow of polymeric material there between and therethrough.

Figure 1:
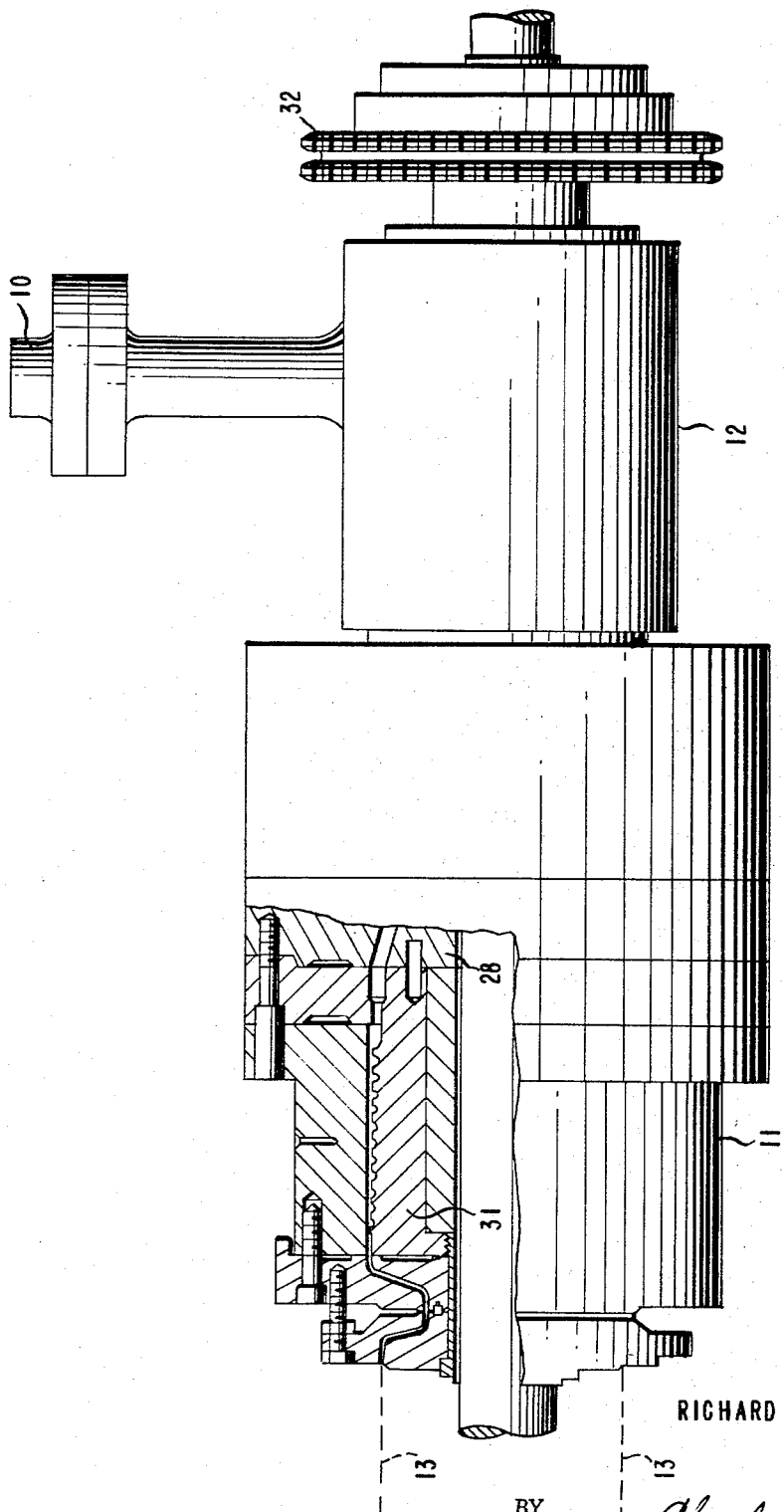
FIGURE 1 is a side elevation view of the general arrangement and organization of the apparatus of the present invention.

The die itself as 11 in FIGURE 1 is attached to the discharge end of the die adapter. There may also be a helical flow distribution of polymeric material within the die 11. This distribution may occur along the length of a helix tapered to allow increasing amounts of axial flow of the polymer melt as the flow progresses toward the discharge end of the helical path. The contour configuration thus causes rapid switching of flow from one supply stream to another for maximum dispersion of non-uniformities.

The extruding die 11 is removably secured to the die adapter 12 in a manner preferably for rotation. The extruding die 11 may be mounted for rotation in the manner as is shown in FIGURE 1 by securing the internal portion 31 thereof to tubular core 28 which extends axially completely through die adapter 12 and is provided at its other end with suitable means as, for example, sprocket 32 for connection to a chain drive assembly.

The accompanying drawings are, of course, only by way of example and various modifications thereof may be made without departing from the spirit and scope of the invention. Also, the spiral passage of the die adapter may be provided with either internal or external threads. The inner and outer members of the die adapter and die may be rotated in any number of various combinations, such as: the outer member rotated and the inner member stationary or vice versa; they may be independently rotated in the same direction at the same or varying speeds; they may be rotated in opposite direction at the same or varying speeds; and so on. Rotation of the die assembly is preferred because it tends to produce a smearing or homogenizing action reducing weld line at the seams, and again improving uniformity of the polymer melt. In addition, helixes and spirals may be located concentrically and overlap each other on the interior and exterior housings of the tubular passage. For instance, two helixes might be right and left hand and have relative rotation. Polymer flow through, and at the same time, from one to the other of the two helixes would be intimately intermixed and distributed in the die adapter, and by nature of design, there would be no dead-flow areas.

A comparison of the effectiveness of the apparatus of the present invention was made in the manner outlined in the examples herebelow.

*Example 1*

The improved uniformity of flow and distribution of polymeric material under simulated conditions of operation was made by flowing silicone oil having a viscosity of 360 poises through the apparatus of the present invention as described hereinabove and shown in FIGURE 2. The silicone oil was continuously supplied at a rate of 241.95 grams per minute to the apparatus as in FIGURE 2 from a vessel maintained under a pressure of 30 p.s.i. and caused to flow through the apparatus and was collected in a group of 24 cups placed in a circle directly under the openings in the die adapter that feed the extruding die. The amount of silicone oil collected in each cup is shown in Table 1 below:

TABLE 1

| Cup No. | Gross Wt. | Tare Wt. | Cup No. | Gross Wt. | Tare Wt. |
| --- | --- | --- | --- | --- | --- |
| 1 | 131.55 | 14.10 | 13 | 129.85 | 14.00 |
| 2 | 128.65 | 14.30 | 14 | 130.25 | 14.15 |
| 3 | 131.35 | 13.90 | 15 | 131.15 | 13.70 |
| 4 | 130.05 | 13.70 | 16 | 130.60 | 13.50 |
| 5 | 133.00 | 13.55 | 17 | 130.70 | 14.10 |
| 6 | 129.55 | 13.40 | 18 | 130.55 | 13.30 |
| 7 | 127.40 | 13.50 | 19 | 133.10 | 13.50 |
| 8 | 131.60 | 13.70 | 20 | 127.65 | 13.60 |
| 9 | 128.85 | 14.20 | 21 | 133.45 | 14.00 |
| 10 | 132.60 | 13.75 | 22 | 130.00 | 13.65 |
| 11 | 128.45 | 13.40 | 23 | 132.15 | 14.20 |
| 12 | 129.55 | 13.85 | 24 | 131.65 | 13.40 |

The average net weight of the silicone oil collected in the sampling cups was 116.80 grams and the maximum percent variation based upon the average of the amount of oil collected in the sampling cups was 4.89%.

In direct contrast, the foregoing experiment when repeated under the same conditions but utilizing only a single side feed inlet instead of the four feed inlets of the double bifurcated feed passages utilized above, resulted in an average net weight of 126.55 grams of silicone oil collected in each sampling cup, and the maximum percent variation of the oil collected in the cups was 17.05%.

The improved uniformity of flow distribution of the apparatus of the present invention is shown graphically in FIGURE 5 which shows the net weight of oil collected in each sampling cup.

*Example 2*

Polypropylene was extruded at a temperature of 213° C. and at a rate of 500 lbs./hr. through a circular die having a die gap opening of 35 mils and the cast tube was quenched and drawn from the die at 31 f.p.m. The die was rotated at ⅓ r.p.m. The relationship of the double bifurcated feed inlets to the die adapter were noted and twenty-four samplings of 1 inch wide and 4 inches long were taken from equally spaced positions around the cast tube and the unit weight of the samplings are noted in column A in Table 2 below. The average weight of each test sampling was 21.066 grams and the maximum percent variation based upon the average weight of each sampling was 0.39%. The improved uniformity of flow distribution of the apparatus of the present invention is shown graphically in FIGURE 6 which shows the weight of each sampling plotted against the radial location around the circular die.

The above experiment was repeated under the same conditions as a control using a single polymer side feed inlet and the results are noted in column B in Table 2 below. The average weight of each test sampling of the control was 19.833 grams and the maximum percent variation based upon the average weight of each sampling was 1.15%. The results are shown graphically in FIGURE 7.

TABLE 2

| Sample No. | A | B |
|---|---|---|
| 1 | 21.091 | 19.8097 |
| 2 | 21.092 | 19.8380 |
| 3 | 21.087 | 19.8419 |
| 4 | 21.079 | 19.8552 |
| 5 | 21.061 | 19.8669 |
| 6 | 21.050 | 19.8555 |
| 7 | 21.039 | 19.9208 |
| 8 | 21.035 | 19.9080 |
| 9 | 21.033 | 19.9164 |
| 10 | 21.027 | 19.8632 |
| 11 | 21.031 | 19.9059 |
| 12 | 21.033 | 19.9072 |
| 13 | 21.064 | 19.8557 |
| 14 | 21.070 | 19.8658 |
| 15 | 21.068 | 19.8354 |
| 16 | 21.066 | 19.7608 |
| 17 | 21.061 | 19.7529 |
| 18 | 21.063 | 19.7255 |
| 19 | 21.070 | 19.6920 |
| 20 | 21.081 | 19.7877 |
| 21 | 21.087 | 19.7886 |
| 22 | 21.087 | 19.8059 |
| 23 | 21.099 | 19.8091 |
| 24 | 21.110 | 19.8253 |

What is claimed is:

1. Apparatus for extruding organic polymeric material comprising a feeder for advancing a stream of polymeric material, an annular extruding die for forming said organic polymeric material into tubular form and an adapter operatively interconnecting said feeder and said die said, adapter having a side inlet communicating with said feeder and a cylindrical flow insert therein having a bifurcated flow passage interconnecting said side inlet and each of four flow ports spaced substantially equally about said flow insert, said flow ports extending through the wall of said cylindrical flow insert and communicating with a helical flow path located internally of said flow insert adapted to advance axially a progressively increasing amount of polymeric material toward said annular die.

2. The apparatus of claim 1 wherein said helical flow path communicates with a spiral flow path in said adapter intermediate said helical flow path and said annular die.

3. The apparatus of claim 2 wherein said helical flow path is stationary and said spiral flow path is rotatable.

4. Apparatus for extruding organic polymeric material comprising a feeder for advancing a stream of polymeric material, an annular extruding die for forming said organic polymeric material into tubular form and an adapter operatively interconnecting said feeder and said die, said adapter having a tubular passage communicating with said feeder and a cylindrical flow insert having a side inlet communicating with said tubular passage and a twice bifurcated flow passage interconnecting said side inlet and each of four flow ports spaced substantially equally about said flow insert, said bifurcated flow passage communicating with a helical path located in said adapter substantially adjacent said inlet means which constrains a major portion of said melt to be advanced, said helical path adapted to progressively permit an increasing amount of melt to advance axially toward said die, and at least one spiral path located in the tubular passage of said adapter between said helical path and the tubular passage of said annular die, said spiral path adapted to advance said polymeric material spirally and axially from said helical path to the tubular passage of said annular die.

References Cited

UNITED STATES PATENTS

| 2,025,666 | 12/1935 | Hanff. |
| 2,174,779 | 10/1939 | Delorme. |
| 2,820,249 | 1/1958 | Colombo. |
| 2,957,201 | 10/1960 | Fields et al. |
| 3,090,994 | 5/1963 | Stenger. |
| 3,343,215 | 9/1967 | Vinkeloe. |

WILLIAM J. STEPHENSON, *Primary Examiner*

U.S. Cl. X.R.

18—12